US012125435B2

(12) United States Patent
Chen et al.

(10) Patent No.: US 12,125,435 B2

(45) Date of Patent: Oct. 22, 2024

(54) PIXEL CIRCUIT WITH PULSE WIDTH COMPENSATION AND OPERATION METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: De-Fu Chen, Guangdong (CN); Po Lun Chen, Guangdong (CN); Chun-Ta Chen, Guangdong (CN); Ta-Jen Huang, Guangdong (CN); Po-Tsun Liu, Guangdong (CN); Guang-Ting Zheng, Guangdong (CN); Ting-Yi Yi, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 120 days.

(21) Appl. No.: 18/063,659

(22) Filed: Dec. 8, 2022

(65) Prior Publication Data

US 2024/0144868 A1 May 2, 2024

(30) Foreign Application Priority Data

Oct. 31, 2022 (CN) ......................... 202211344595.3

(51) Int. Cl.
*G09G 3/3208* (2016.01)

(52) U.S. Cl.
CPC ... *G09G 3/3208* (2013.01); *G09G 2300/0852* (2013.01); *G09G 2310/061* (2013.01);
(Continued)

(58) Field of Classification Search
CPC ......... G09G 3/3208; G09G 2300/0852; G09G 2310/061; G09G 2310/08;
(Continued)

(56) References Cited

U.S. PATENT DOCUMENTS

| | | | | |
|---|---|---|---|---|
| 11,361,701 | B1 * | 6/2022 | Tung | H03K 17/6871 |
| 2010/0007386 | A1 | 1/2010 | Jinta | |
| 2022/0215797 | A1 | 7/2022 | Zhai | |

FOREIGN PATENT DOCUMENTS

| | | | |
|---|---|---|---|
| CN | 108694908 | A | 10/2018 |
| CN | 114299864 | A | 4/2022 |
| TW | I732602 | B | 7/2021 |

* cited by examiner

*Primary Examiner* — Amare Mengistu
*Assistant Examiner* — Gloryvid Figueroa-Gibson
(74) *Attorney, Agent, or Firm* — CKC & Partners Co., LLC

(57) ABSTRACT

The present disclosure provides a pixel circuit with pulse width compensation, and the pixel circuit includes a pulse width modulation circuit and a pulse amplitude modulation circuit, and the pulse amplitude modulation circuit is electrically connected to the pulse width modulation circuit. The pulse width modulation circuit includes a P-type pulse width compensation transistor and a first P-type control transistor, and the first P-type control transistor is electrically connected to the P-type pulse width compensation transistor. The pulse amplitude modulation circuit includes a second P-type control transistor, a first capacitor, a P-type driving transistor and a light-emitting element. The second P-type control transistor is electrically connected to the first P-type control transistor. The first capacitor is electrically connected to the second P-type control transistor. The P-type driving transistor is electrically connected to the first capacitor, and the light-emitting element is electrically connected to the P-type driving transistor.

19 Claims, 5 Drawing Sheets

(52) U.S. Cl.
CPC ... *G09G 2310/08* (2013.01); *G09G 2320/045* (2013.01); *G09G 2320/0633* (2013.01); *G09G 2330/023* (2013.01)

(58) Field of Classification Search
CPC ..... G09G 2320/045; G09G 2320/0633; G09G 2330/023; G09G 3/3233; G09G 3/3225; G09G 3/3258
See application file for complete search history.

100

PIXEL CIRCUIT WITH PULSE WIDTH COMPENSATION AND OPERATION METHOD THEREOF

This application claims priority to China Application Serial Number 202211344595.3, filed Oct. 31, 2022, which is herein incorporated by reference.

BACKGROUND

Field of Invention

The present invention relates to pixel circuits and operation methods, and more particularly, a pixel circuit with pulse width compensation and an operation method thereof.

Description of Related Art

In recent years, with the vigorous development of display technology, active organic light emitting diode display technology with advantages such as high contrast ratio and low power consumption has been widely used in mobile phones, tablets, and screen displays.

In view of the foregoing, there still exist some problems on the driving capability of the pixel circuit that await further improvement. However, those skilled in the art sought vainly for a solution. Accordingly, there is an urgent need in the related field to propose a new pixel circuit to improve the driving capability.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a pixel circuit with pulse width compensation and its operation method, to solve or circumvent aforesaid problems and disadvantages in the related art.

An embodiment of the present disclosure is related to a pixel circuit with pulse width compensation, and the pixel circuit includes a pulse width modulation circuit and a pulse amplitude modulation circuit, and the pulse amplitude modulation circuit is electrically connected to the pulse width modulation circuit. The pulse width modulation circuit includes a P-type pulse width compensation transistor and a first P-type control transistor, and the first P-type control transistor is electrically connected to the P-type pulse width compensation transistor. The pulse amplitude modulation circuit includes a second P-type control transistor, a first capacitor, a P-type driving transistor and a light-emitting element. The second P-type control transistor is electrically connected to the first P-type control transistor. The first capacitor is electrically connected to the second P-type control transistor. The P-type driving transistor is electrically connected to the first capacitor, and the light-emitting element is electrically connected to the P-type driving transistor.

In one embodiment of the present disclosure, the first P-type control transistor includes a control terminal, the P-type pulse width compensation transistor includes a first terminal, a second terminal and a control terminal, the first terminal of the P-type includes compensation transistor is electrically connected to the control terminal of the first P-type control transistor, the second terminal of the P-type pulse width compensation transistor receives a scanning voltage, and the control terminal of the P-type pulse width compensation transistor receives a light-emitting signal.

In one embodiment of the present disclosure, the first P-type control transistor includes a control terminal, and the pulse width modulation circuit includes a data writing transistor. The data writing transistor includes a first terminal, a second terminal and a control terminal. The first terminal of the data writing transistor is electrically connected to the control terminal of the first P-type control transistor, the second terminal of the data writing transistor receives a data voltage, and the control terminal of the data writing transistor receives a control signal.

In one embodiment of the present disclosure, the first P-type control transistor includes a first terminal, a second terminal and a control terminal, and the pulse width modulation circuit includes a first P-type reset transistor and a second P-type reset transistor. The first P-type reset transistor includes a first terminal, a second terminal and a control terminal. The first terminal of the first P-type reset transistor is electrically connected to the first terminal of the first P-type control transistor, the second terminal of the first P-type reset transistor is electrically connected to the control terminal of the first P-type control transistor, and the control terminal of the first P-type reset transistor receives a control signal. The second P-type reset transistor includes a first terminal, a second terminal and a control terminal. The first terminal of the second P-type reset transistor is electrically connected to the second terminal of the first P-type control transistor, the second terminal of the second P-type reset transistor receives a reference voltage, and the control terminal of the second P-type reset transistor receives the control signal.

In one embodiment of the present disclosure, the first P-type control transistor includes a first terminal, the second P-type control transistor includes a control terminal, and the pulse width modulation circuit includes a P-type reset transistor. The P-type reset transistor includes a first terminal, a second terminal and a control terminal. The first terminal of the P-type reset transistor is electrically connected to the first terminal of the first P-type control transistor terminal and the control terminal of the second P-type control transistor, the second terminal of the P-type reset transistor receives a reference voltage, and the control terminal of the P-type reset transistor receives an inverted light-emitting signal.

In one embodiment of the present disclosure, the second P-type control transistor includes a first terminal, a second terminal and a control terminal, the second terminal of the second P-type control transistor receives a driving voltage, and the pulse amplitude modulation circuit includes a P-type reset transistor. The P-type reset transistor includes a first terminal, a second terminal and a control terminal. The first terminal of the P-type reset transistor is electrically connected to the first terminal of the second P-type control transistor, the second terminal of the P-type reset transistor receives a reference voltage, and the control terminal of the P-type reset transistor receives an inverted light-emitting signal.

In one embodiment of the present disclosure, the second P-type control transistor includes a first terminal, and the pulse amplitude modulation circuit includes a second capacitor connected in series with the first capacitor. One terminal of the second capacitor is electrically connected to the first terminal of the second P-type control transistor and the first capacitor, and another terminal of the second capacitor receives a reference voltage.

In one embodiment of the present disclosure, the P-type driving transistor includes a first terminal, a second terminal and a control terminal, the light-emitting element includes an anode and a cathode, the anode of the light-emitting element receives a first operating voltage, the cathode of the light-emitting element is electrically connected to the second terminal of the P-type driving transistor, the first terminal of the P-type driving transistor receives a second operating voltage, the control terminal of the P-type driving transistor is electrically connected to the first capacitor, and the first operating voltage is higher than the second operating voltage.

In one embodiment of the present disclosure, the pulse amplitude modulation circuit includes a P-type switching transistor. The P-type switching transistor includes a first terminal, a second terminal and a control terminal. The first terminal of the P-type switching transistor is electrically connected to the control terminal of the P-type driving transistor, the second terminal of the P-type switching transistor receives the first operating voltage, and the control terminal of the P-type switching transistor receives a control signal.

In one embodiment of the present disclosure, the pulse amplitude modulation circuit includes a P-type threshold voltage compensation transistor and a P-type switching transistor. The P-type threshold voltage compensation transistor includes a first terminal, a second terminal and a control terminal. The second terminal and the control terminal of the P-type threshold voltage compensation transistor receive a reference voltage. The P-type switching transistor includes a first terminal, a second terminal and a control terminal. The first terminal of the P-type switching transistor is electrically connected to the first capacitor, the second terminal of the P-type switching transistor is electrically connected to the first terminal of the P-type threshold voltage compensation transistor, and the control terminal of the P-type switching transistor receives a control signal.

Another embodiment of the present disclosure is related to a pixel circuit with pulse width compensation, and the pixel circuit includes a pulse width modulation circuit and a pulse amplitude modulation circuit, and the pulse amplitude modulation circuit is electrically connected to the pulse width modulation circuit. The pulse width modulation circuit includes a P-type pulse width compensation transistor and a first P-type control transistor, and the first P-type control transistor is electrically connected to the P-type pulse width compensation transistor. The pulse amplitude modulation circuit includes a P-type driving transistor and a second P-type control transistor. The P-type driving transistor is electrically connected to a light-emitting element. The second P-type control transistor is electrically connected to the first P-type control transistor, and the second P-type control transistor is electrically connected to the P-type driving transistor through a capacitor. In an emission period, the P-type pulse width compensation transistor is turned on, so that the first P-type control transistor is turned on to turn on the second P-type control transistor, so as to turn on the P-type driving transistor for driving the light-emitting element to emit light.

In one embodiment of the present disclosure, the pulse width modulation circuit includes a first P-type reset transistor, a second P-type reset transistor and a third P-type reset transistor, the pulse amplitude modulation circuit includes a fourth P-type reset transistor and a P-type switching transistor, the first P-type control transistor includes a first terminal, a second terminal and a control terminal, the first terminal of the first P-type control transistor is electrically the first and third P-type reset transistors, the second terminal of the first P-type control transistor is electrically connected to the second P-type reset transistor, the control terminal of the first P-type control transistor is electrically connected between the P-type pulse width compensation transistor and the first P-type reset transistor, the fourth P-type reset transistor is electrically connected to the second P-type control transistor, and the P-type switching transistor is electrically connected to the P-type driving transistor and the light-emitting element. In a reset period, the P-type pulse width compensation transistor is turned off by a disabling level of a light-emitting signal, the third and fourth P-type reset transistors are turned on by an enabling level of an inverted light-emitting signal, and the first and second P-type reset transistors and the P-type switching transistor are turned on by the enabling level of a control signal, so that the P-type driving transistor is turned off.

In one embodiment of the present disclosure, the pulse width modulation circuit includes a data writing transistor, the pulse amplitude modulation circuit includes a P-type threshold voltage compensation transistor and a P-type switching transistor, the first P-type control transistor includes a control terminal, the control terminal of the first P-type control transistor is electrically connected to the P-type pulse width compensation transistor and the data writing transistor, the P-type switching transistor is electrically connected to the P-type driving transistor and the capacitor through a node, the P-type threshold voltage compensation transistor is electrically connected to the P-type switching transistor, and the P-type threshold voltage compensation transistor receives a reference voltage. In a compensation and data input period, the P-type pulse width compensation transistor is turned off by a disabling level of a light-emitting signal, the data writing transistor and the P-type switching transistor are turned on by an enabling level of a control signal, so that the data writing transistor writes a data voltage to the control terminal of the first P-type control transistor, and the P-type threshold voltage compensation transistor discharges the node to the reference voltage plus a threshold voltage of the P-type threshold voltage compensation transistor.

In one embodiment of the present disclosure, the first P-type control transistor further includes a first terminal, the second P-type control transistor includes a first terminal, a second terminal and a control terminal, the P-type driving transistor includes a control terminal, the control terminal of the first P-type control transistor is electrically connected to the data writing transistor, the first terminal of the first P-type control transistor is electrically connected to the control terminal of the second P-type control transistor, and the first terminal of the second P-type control transistor is electrically connected to the control terminal of the P-type driving transistor through the capacitor. In the emission period, the P-type pulse width compensation transistor is turned on by the enabling level of the light-emitting signal, when the data voltage is greater than a sawtooth voltage received by the P-type plus width compensation transistor, the first P-type control transistor is turned on to turn on the second P-type control transistor, and the second terminal of the second P-type control transistor receive a driving voltage having the enabling level, so that the P-type driving transistors are turned on to drive the light-emitting element to emit the light.

In one embodiment of the present disclosure, the pulse width modulation circuit includes a P-type reset transistor, the pulse amplitude modulation circuit includes a P-type reset transistor, the P-type reset transistor of the pulse width modulation circuit is electrically connected to the first P-type control transistor, and the P-type reset transistor of the pulse amplitude modulation circuit is electrically connected to the second P-type control transistor. In a turn-off period, the P-type pulse width compensation transistor is turned off by a disabling level of a light-emitting signal, and the P-type reset transistor of the pulse width modulation circuit and the P-type reset transistor of the pulse amplitude modulation circuit are turned on by an enabling level of an inverted light-emitting signal.

Yet another embodiment of the present disclosure is related to an operation method of a pixel circuit with pulse width compensation, the pixel circuit includes a pulse width modulation circuit and a pulse amplitude modulation circuit, the pulse width modulation circuit includes a P-type pulse width compensation transistor and a first P-type control transistor, the pulse amplitude modulation circuit includes a P-type driving transistor and a second P-type control transistor, and the operation method includes steps of: in an emission period, turning on the P-type pulse width compensation transistor is, so that the first P-type control transistor is turned on to turn on the second P-type control transistor, so as to turn on the P-type driving transistor; driving the light-emitting element to emit light through the P-type driving transistor when the P-type driving transistor is turned on.

In one embodiment of the present disclosure, the pulse width modulation circuit includes a first P-type reset transistor, a second P-type reset transistor and a third P-type reset transistor, the pulse amplitude modulation circuit includes a fourth P-type reset transistor and a P-type switching transistor, and the operation method further includes steps of: in a reset period, providing a light-emitting signal having a disabling level for the P-type pulse width compensation transistor, so that the P-type pulse width compensation transistor is turned off; in the reset period, providing an inverted light-emitting signal having an enabling level for the third and fourth P-type reset transistors, so that the third and fourth P-type reset transistors are turned on; in the reset period, providing a control signal having the enabling level for the first and second P-type reset transistors and the P-type switching transistor, so that the first and second P-type reset transistors and the P-type switching transistor are turned on, and the P-type driving transistor is turned off.

In one embodiment of the present disclosure, the pulse width modulation circuit includes a data writing transistor, the pulse amplitude modulation circuit includes a P-type threshold voltage compensation transistor and a P-type switching transistor, and the operation method further includes steps of: in a compensation and data input period, providing a light-emitting signal having a disabling level for the P-type pulse width compensation transistor, so that the P-type pulse width compensation transistor is turned off; in the compensation and data input period, providing a control signal having an enabling level for the data writing transistor, so that the data writing transistor is turned on, and the data writing transistor writes a data voltage to a control terminal of the first P-type control transistor; in the compensation and data input period, providing the control signal having the enabling level for the P-type switching transistor, so that the P-type switching transistor is turned on, and the P-type threshold voltage compensation transistor discharges a node to a reference voltage plus a threshold voltage of the P-type threshold voltage compensation transistor.

In one embodiment of the present disclosure, the operation method further includes steps of: in the emission period, providing the light-emitting signal having the enabling level for the P-type pulse width compensation transistor, so that the P-type pulse width compensation transistor is turned on; in the emission period, when the data voltage is greater than a sawtooth voltage received by the P-type plus width compensation transistor, turning on the first P-type control transistor to turn on the second P-type control transistor, and providing a driving voltage having the enabling level for the second P-type control transistor, so that the P-type driving transistor is turned on to drive the light-emitting element to emit the light.

In one embodiment of the present disclosure, the pulse width modulation circuit includes a P-type reset transistor electrically connected to the first P-type control transistor, the pulse amplitude modulation circuit includes a P-type reset transistor electrically connected to the second P-type control transistor, and the operation method further includes steps of: in a turn-off period, providing a light-emitting signal having a disabling level for the P-type pulse width compensation transistor, so that the P-type pulse width compensation transistor is turned off; in the turn-off period, providing an inverted light-emitting signal having an enabling level for the P-type reset transistor of the pulse width modulation circuit and the P-type reset transistor of the pulse amplitude modulation circuit, so that the P-type reset transistor of the pulse width modulation circuit and the P-type reset transistor of the pulse amplitude modulation circuit are turned on.

In view of the above, according to the present disclosure, the pixel circuit of the present disclosure and the operation method thereof using all P-type transistors (e.g., low temperature polysilicon thin film transistors) can save costs and also avoid the problem of insufficient driving capability due to excessive size.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
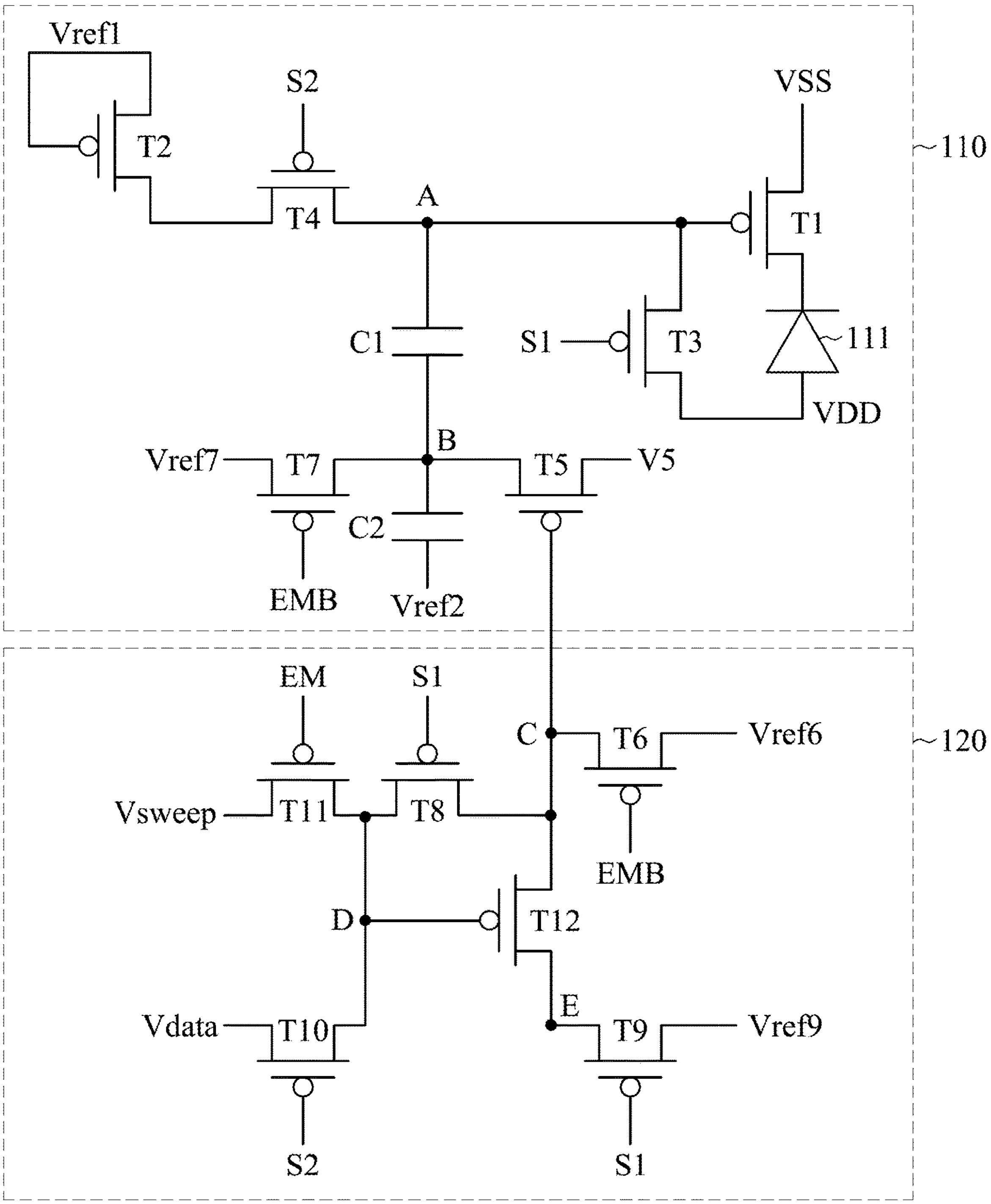
FIG. 1 is a block diagram of a pixel circuit according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used in the description herein and throughout the claims that follow, the meaning of “a”, “an”, and “the” includes reference to the plural unless the context clearly dictates otherwise.

As used herein, “around”, “about”, “substantially” or “approximately” shall generally mean within 20 percent, preferably within 10 percent, and more preferably within 5 percent of a given value or range. Numerical quantities given herein are approximate, meaning that the term “around”, “about”, “substantially” or “approximately” can be inferred if not expressly stated.

Also, as used in the description herein and throughout the claims that follow, the terms “comprise or comprising”, “include or including”, “have or having”, “contain or containing” and the like are to be understood to be open-ended, i.e., to mean including but not limited to.

Referring to FIG. 1. In one aspect, the present disclosure is directed to a pixel circuit 100. This circuit may be easily integrated into a micro light-emitting diode display and may be applicable or readily adaptable to all technologies. The pixel circuit 100 of the present disclosure can effectively improve the driving capability. Accordingly, the pixel circuit 100 has advantages. Herewith the pixel circuit 100 is described below with FIG. 1.

The subject disclosure provides the pixel circuit 100 of FIG. 1 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word “exemplary” is used herein to mean “serving as an example, instance, or illustration.” Any embodiment described herein as “exemplary” is not necessarily to be construed as preferred or advantageous over other embodiments.

FIG. 1 is a block diagram of the pixel circuit 100 according to some embodiments of the present disclosure. As shown in FIG. 1, the pixel circuit 100 can at least include a pulse width modulation circuit 120 and a pulse amplitude modulation circuit 110. Structurally, the pulse amplitude modulation circuit 110 is electrically connected to the pulse width modulation circuit 120. In use, the operation of the pulse amplitude modulation circuit 110 can compensate for the change in the threshold voltage of the P-type driving transistor T1 to stabilize the current driving of the light-emitting element 111, and the operation of the pulse width modulation circuit 120 maintains the optimal brightness of the light-emitting element 111 in a working state, thereby minimizing the power consumption of the circuit.

As shown in FIG. 1, in one or more embodiments of the present disclosure, the pulse width modulation circuit 120 at least includes a P-type pulse width compensation transistor T11 and a first P-type control transistor T12. Structurally, the first P-type control transistor T12 is electrically connected to the P-type pulse width compensation transistor T11. The pulse amplitude modulation circuit includes a second P-type control transistor T5 and a P-type driving transistor T1. Structurally, the P-type driving transistor T1 is electrically connected to light-emitting element 111, the second P-type control transistor T5 is electrically connected to the first P-type control transistorT1, and the second P-type control transistor T5 is electrically connected to the P-type driving transistor T1 through first capacitor C1. In this way, the pixel circuit 100 using all P-type transistors (e.g., low temperature polysilicon thin film transistors) can save costs and also avoid the problem of insufficient driving capability due to excessive size. In a control experiment, a circuit does not have all P-type transistors, and thus, the use of micro-LEDs in ultra-high-resolution panel applications results in excessive size and insufficient driving capability.

With the above all-P-type transistor structure, in the emission period, the P-type pulse width compensation transistor T11 is turned on, so that the first P-type control transistor T12 is turned on to turn on the second P-type control transistor T5, thereby turning on the P-type driving transistor. The transistorT1 drives the light-emitting element111 to emit light.

As shown in FIG. 1, in one or more embodiments of the present disclosure, the pulse width modulation circuit 120 includes a first P-type reset transistor T8, a second P-type reset transistor T9 and a third P-type reset transistor T6. The pulse amplitude modulation circuit 110 includes a fourth P-type reset transistor T7 and a P-type switching transistor T3.

Structurally, the first terminal of the first P-type control transistor T12 is electrically connected to the first and third P-type reset transistors T8 and T6, and the second terminal of the first P-type control transistor T12 is electrically connected to the second P-type reset transistor T9. The control terminal of the first P-type control transistorT12 is electrically connected between the P-type pulse width compensation transistor T11 and the first P-type reset transistor T8, the fourth P-type reset transistor T7 is electrically connected to the second P-type control transistor T5, and the P-type switching transistor The transistor T3 is electrically connected to the P-type driving transistor T1 and the light-emitting element 111.

With the above all-P-type transistor structure, in the reset period, the P-type pulse width compensation transistor T11 is turned off by the disabling level of the light-emitting signal EM, and the third and fourth P-type reset transistors T6 and T7 are turned on by the enabling level of the inverted light-emitting signal EMB, the first and second P-type reset transistors T8 and T9 and P-type switching transistor T3 are turned on by the enabling level of the control signal S1, so that the P-type driving transistor T1 is turned off; the voltage of A is about the first operating voltage VDD, which turns off the P-type driving transistor T1.

As shown in FIG. 1, in one or more embodiments of the present disclosure, the pulse width modulation circuit 120 includes a data writing transistor T10, and the pulse amplitude modulation circuit 110 includes a P-type threshold voltage compensation transistor T2 and a P-type switching transistor T4.

Structurally, the control terminal of the first P-type control transistor T12 is electrically connected to the P-type pulse width compensation transistor T11 and the data writing transistor T10, and the P-type switching transistor T4 is electrically connected to the P-type driving transistor T1 and the first capacitorC1 through the node A, the P-type threshold voltage compensation transistor T2 is electrically connected to the P-type switching transistorT4, and the P-type threshold voltage compensation transistorT2 receives the reference voltage Vref1.

With the above-mentioned all-P-type transistor structure, after the above-mentioned reset period, in the compensation and data input period, the P-type pulse width compensation transistor T11 is turned off by the disabling level of the light-emitting signal, and the data writing transistor T6 and P-type switching transistor T4 are turned on by the enabling level of control signal S2, so that the data writing transistor T10 writes data voltage Vdata to the control terminal of first P-type control transistor T12, and P-type threshold voltage compensation transistor T2 discharges the node A to the reference voltage plus the threshold voltage of P-type threshold voltage compensation transistor T2. However, the voltage between source and gate of P-type driving transistor T1 is lower than the threshold voltage of P-type driving transistor T1, and the voltage from the source to the gate of first P-type control transistor T12 is lower than the threshold voltage of the first P-type control transistor T12; at this time, the P-type driving transistor T1 and the first P-type control transistor T12 are not turned on.

As shown in FIG. 1, in one or more embodiments of the present disclosure, structurally, the control terminal of the first P-type control transistor T12 is electrically connected to the data writing transistor T10, the first terminal of the first P-type control transistor T12 is electrically connected to the control terminal of the second P-type control transistor T5, and the first terminal of the second P-type control transistor T5 is electrically connected to the control terminal of the P-type driving transistor T1 through the first capacitor C1.

With the above-mentioned all-P-type transistor structure, after the above-mentioned compensation and data input period, during the emission period, the P-type pulse width compensation transistor T11 is turned on by the enabling level of the light-emitting signal EM, when the data voltage Vdata is greater than the scanning voltage Vsweep (e.g., a sawtooth voltage) received by the P-type pulse width compensation transistor T11, the first P-type control transistor T12 is turned on to turn on the second P-type control transistor T5. The second terminal of the second P-type control transistor T5 receives the driving voltage V5 having the enabling level, so that the P-type driving transistor T1 is turned on to drive the light-emitting element 111 to emit light.

Then, after the above-mentioned emission period, in the turn-off period, the P-type pulse width compensation transistorT11 is turned off by the disabling level of the light-emitting signal, and the third P-type reset transistor T6 and the fourth P-type reset transistor T7 are turned on by the enabling level of the inverted light-emitting signal, so that the P-type driving transistor T1 is turned off.

Regarding the overall circuit structure of the pulse width modulation circuit 120, as shown in FIG. 1, in one or more embodiments of the present disclosure, the P-type pulse width compensation transistor T11, the data writing transistor T10 and the first P-type The reset transistor T8 are electrically connected to the first P-type control transistor T12 through the node D, the third P-type reset transistor T6 and the first P-type reset transistor T8 are electrically connected to the first P-type control transistor T12 through the node C, and the second P-type reset transistor T9 is electrically connected to first P-type control transistor T12 through the node E. Alternatively, in another embodiment, the overall circuit structure of the pulse width modulation circuit 120 can also be flexibly adjusted according to practical applications.

Specifically, regarding the connection structure of the P-type pulse width compensation transistor T11, as shown in FIG. 1, in one or more embodiments of the present disclosure, the first terminal of the P-type pulse width compensation transistor T11 is electrically connected to the control terminal of the first P-type control transistor T12. The second terminal of the P-type pulse width compensation transistor T11 receives the scanning voltage Vsweep, and the control terminal of the P-type pulse width compensation transistor T11 receives the light-emitting signal EM.

Specifically, regarding the connection structure of the data writing transistor T10, as shown in FIG. 1, in one or more embodiments of the present disclosure, the first terminal of the data writing transistor T10 is electrically connected to the control terminal of the first P-type control transistor T11. The second terminal of the data writing transistor T10 receives the data voltage Vdata, and the control terminal of the data writing transistor T10 receives the control signal S2.

Specifically, regarding the connection structure of the first and second P-type reset transistors T8 and T9, as shown in FIG. 1, in one or more embodiments of the present disclosure, the first terminal of the first P-type reset transistor T8 is electrically connected to the first terminal of the first P-type control transistor T12, the second terminal of the first P-type reset transistor T8 is electrically connected to the control terminal of the first P-type control transistor T12, and the control terminal of the first P-type reset transistor T8 receives the control signal S1. The first terminal of the second P-type reset transistor T9 is electrically connected to the second terminal of the first P-type control transistor T8, the second terminal of the second P-type reset transistor T9 receives the reference voltage Vref9 (e.g., about 3 V), and the control terminal of the second P-type reset transistor T9 receives the control signal S1. In another embodiment, the first and second P-type reset transistors T8 and T9 can be replaced with other types of transistors, but the present disclosure is not limited thereto.

Specifically, regarding the connection structure of the third P-type reset transistor T6, the first terminal of the third P-type reset transistor T6 is electrically connected to the first terminal of the first P-type control transistor T12 and the control terminal of the second P-type control transistor T5, the second terminal of the third P-type reset transistor T6 receives the reference voltage Vref6 (e.g., about 7V), and the control terminal of the third P-type reset transistor T6 receives the inverted light-emitting signal EMB.

Specifically, regarding the overall circuit structure of the pulse amplitude modulation circuit 110, as shown in FIG. 1, in one or more embodiments of the present disclosure, the fourth P-type reset transistor T7, the first capacitor C1 and the second capacitor C2 are electrically connected to the second P-type control transistor T5 through the node B, the P-type switching transistor T4 and the first capacitor C1 are electrically connected to the P-type switching transistor T3 and the P-type driving transistor T1 through the node A, the P-type driving transistor T1 is electrically connected to the light-emitting element111, and the P-type threshold voltage compensation transistor T2 is electrically connected to the P-type switching transistor T4. In practice, for example, the device specifications of the P-type threshold voltage compensation transistor T2 and the device specifications of the P-type driving transistor T1 can be the same, but the present disclosure is not limited thereto. In use, the threshold voltage of the P-type threshold voltage compensation transistor T2 is used to compensate the threshold voltage of the P-type driving transistor T1, so as to avoid affecting the current of the light-emitting element 111 due to the variation of the threshold voltage of the P-type driving transistor T1. Alternatively, in another embodiment, the overall circuit structure of the pulse amplitude modulation circuit 110 can also be flexibly adjusted according to practical applications.

Specifically, regarding the connection structure of the fourth P-type reset transistor T7, as shown in FIG. 1, in one or more embodiments of the present disclosure, the first terminal of the fourth P-type reset transistor T7 is electrically connected to the first terminal of the second P-type control transistor T5, the second terminal of the fourth P-type reset transistor T7 receives the reference voltage Vref7 (e.g., about 7 V), and the control terminal of the fourth P-type reset transistor T7 receives the inverted light-emitting signal EMB.

Specifically, regarding the connection structure of the first and second capacitors C1 and C2, as shown in FIG. 1, in one or more embodiments of the present disclosure, the first capacitor C1 and the second capacitor C2 are connected in series. One terminal of the capacitor C2 is electrically connected to the first terminal of the second P-type control transistor T5 and the first capacitor C1, and another terminal of the capacitor C2 receives the reference voltage Vref7 (e.g., about 3 V).

Specifically, regarding the connection structure of the P-type driving transistor T1, as shown in FIG. 1, in one or more embodiments of the present disclosure, the anode of the light-emitting element 111 receives the first operating voltage VDD, the cathode of the light-emitting element 111 is electrically connected to the second terminal of the P-type driving transistor T1, the first terminal of the P-type driving transistor T1 receives the second operating voltage VSS, and the control terminal of the P-type driving transistor T1 is electrically connected to the first capacitor C1, in which the first operating voltage VDD (e.g., about 8V) is higher than the second operating voltage VSS (e.g., about 1V).

Specifically, regarding the connection structure of the P-type switching transistor T3, as shown in FIG. 1, in one or more embodiments of the present disclosure, the first terminal of the P-type switching transistor T3 is electrically connected to the control terminal of the P-type driving transistor T1, the second terminal of the P-type switching transistor T3 receives the first operating voltage VDD, and the control terminal of the P-type switching transistor T3 receives the control signal S1.

Specifically, regarding the connection structure of the P-type threshold voltage compensation transistor T2 and the P-type switching transistor T4, as shown in FIG. 1, in one or more embodiments of the present disclosure, the second terminal and the control terminal of the P-type switching transistor T2 receive the reference voltage Vref1 (e.g., about 6.8V). The first terminal of the P-type switching transistor T4 is electrically connected to the first capacitor C1, the second terminal of the P-type switching transistor T4 is electrically connected to the first terminal of the P-type threshold voltage compensation transistor T2, and the control terminal of the P-type switching transistor T4 receives the control signal S2.

In view of above, for example, the reference voltage Vref1 can be about 6.8V, the reference voltage Vref2 and the reference voltage Vref9 can be about 3V, and the reference voltage Vref6 and the reference voltage Vref7 can be about 3V, but the present disclosure is not limited thereto. However, in practice, the values of the reference voltages Vref1, Vref2, Vref6, Vref7 and Vref9 can be flexibly adjusted depending on the actual application, so as to adjust the output or switching time.

Figure 2:
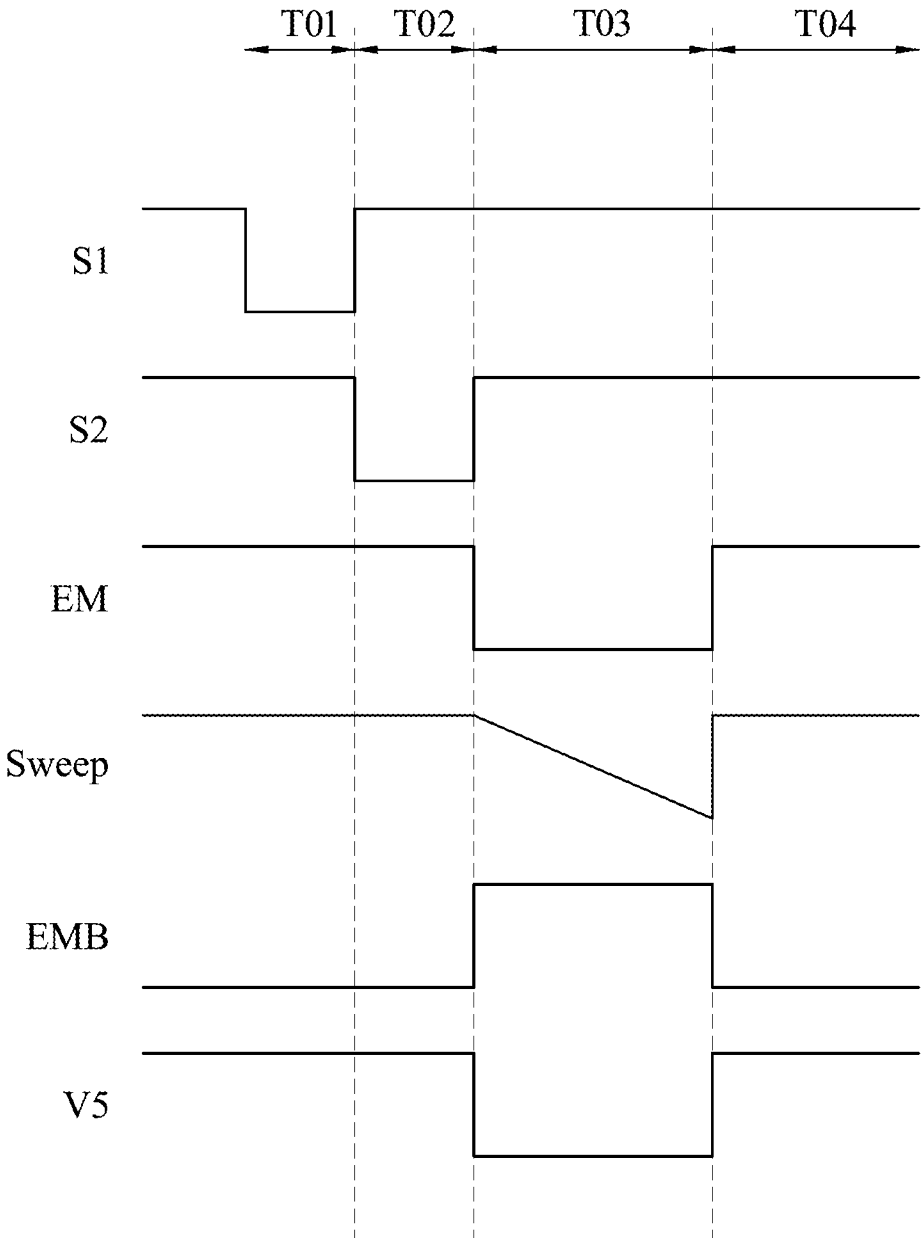
FIG. 2 is a timing diagram of an operation method of the pixel circuit according to some embodiments of the present disclosure.

For further illustrating the operation method of the pixel circuit 100, refer to FIG. 1 and FIG. 2. FIG. 2 is a timing diagram of an operation method of the pixel circuit according to some embodiments of the present disclosure. As shown in FIG. 2, the operation method includes the reset period T01, the compensation and data input period T02, the emission period T03 and the turn-off period T04. In one or more embodiments of the present disclosure, the enabling level is about −3V, and the disabling level is about 15V, but the present disclosure is not limited thereto.

In the reset period T01, the light-emitting signal EM having disabling level is provided to the P-type pulse width compensation transistor T11, so that the P-type pulse width compensation transistor T11 is turned off; the inverted light-emitting signal EMB having the enabling level is provided to third and fourth P-type reset transistors T6 and T7, so that the third and fourth P-type reset transistors T6 and T7 are turned on; a control signal S1 having the enabling level is provided to the first and second P-type reset transistorsT8 and T9 and the P-type switching transistor T3, so that the first and second P-type reset transistorsT8 and T9 and the P-type switching transistor T3 are turned on, and the P-type driving transistor T1 is turned off; the control signal S2 having the disabling level is provided to the data writing transistor T10 and P-type switching transistor T4, so that the data writing transistor T10 and the P-type switching transistor T4 are turned off. At this time, the first and second P-type control transistors T12 and T5 are turned off, and the P-type threshold voltage compensation transistor T2 is turned on.

In the compensation and data input period T02, the light-emitting signal EM having the disabling level is provided to the P-type pulse width compensation transistor T11, so that the P-type pulse width compensation transistor T11 is turned off; the control signal S2 having the enabling level is provided to the data writing transistor T10, so that the data writing transistor T10 is turned on to write the data voltage Vdata to the control terminal of the first P-type control transistor T12, but the voltage from the source to the gate of the first P-type control transistor T12 is less than the threshold voltage of the first P-type control transistor T12, at this time, the first P-type control transistor T12 is not turned on; the control signal S2 having the enabling level is provided to the P-type switching transistorT4, so that the P-type switching transistor T4 is turned on, and the P-type threshold voltage compensation transistor T2 discharges the node A to the reference voltage Vref1 plus the threshold voltage of the upper P-type threshold voltage compensation transistor T2, but the voltage between the source and the gate stage of the P-type driving transistor T1 is lower than the threshold voltage of the P-type driving transistor T1, so that the P-type driving transistor T1 is not turned on. In addition, the inverted light-emitting signal EMB having the enabling level is provided to the third and fourth P-type reset transistors T6 and T7, so that the third and fourth P-type reset transistors T6 and T7 are turned on; the control signal S1 having the disabling level is provided to the first and second P-type reset transistors T8 and T9 and the P-type switching transistor T3, so that the first and second P-type reset transistors T8 and T9 and the P-type switching transistor T3 are turned off.

In the emission periodT03, the light-emitting signal EM having the enabling level is provided to the P-type pulse width compensation transistor T11, so that the P-type pulse width compensation transistor T11 is turned on, and when the data voltage Vdata is greater than the scanning voltage Vsweep (e.g., the sawtooth voltage) received by the P-type pulse width compensation transistor T11, the first P-type control transistorT12 is turned on to turn on the second P-type control transistor T5; the driving voltage V5 having the enabling level to the second P-type control transistor T5, so that the P-type driving transistor T1 is turned on, so as to drive the light-emitting element 111 to emit light. In practice, for example, the above-mentioned sawtooth voltage can be linearly decreased from the disabling level to the enabling level within the emission period T03, but the present disclosure is not limited thereto.

Specifically, when the data voltage Vdata is greater than the scanning voltage Vsweep, the first P-type control transistor T12 is turned on, thereby pulling down the voltage level of the node C; at this time, the driving voltage V5 is in the enabling level (i.e., a low level). The voltage between the source and the gate of the second P-type control transistor T5 is greater than the threshold voltage of the second P-type control transistor T5, and thus the second P-type control transistor T5 is turned on, thereby pulling down the voltage of the node A, so that the P-type driving transistor T1 is turned on.

In addition, the inverted light-emitting signal EMB having the disabling level is provided to the third and fourth P-type reset transistors T6 and T7, the third and fourth P-type reset transistors T6 and T7 are turned off; the control signal S1 having the disabling level is provided to the first and second P-type reset transistors T8 and T9 and P-type switching transistor T3, so that the first and second P-type reset transistors T8 and T9 and the P-type switching transistor T3 are turned off; the control signal S2 having the disabling level is provided to the data writing transistorT10 and the P-type switching transistor T4, so that the data writing transistor T10 and the P-type switching transistor T4 are turned off.

In this way, in the emission period T03, the P-type pulse width compensation transistor T11 is turned on, so that the first P-type control transistor P12 is turned on to turn on the second P-type control transistor T5, thereby turning on the P-type driving transistor T1; when the P-type driving transistor T1 is turned on, the light-emitting element 111 is driven to emit light through the P-type driving transistor T1. The current through the light-emitting element 111 satisfies the relation as below.

ILED=½k[(VGS-VTH)]^2=½k[(Vref1+Vth_T2+V5−Vref7−VSS−Vth_T1)]^2=½k [(Vref1+V5−Vref7−VSS)]^2, where k is a parameter (e.g., μCoxW/L), ILED is the current through the light-emitting element 111, Vth_T2 is the threshold voltage of the P-type threshold voltage compensation transistor T2, and Vth_T1 is the threshold voltage of the P-type driving transistor T2, where Vth_T2 is used to compensate Vth_T1.

In the turn-off period T04, the light-emitting signal EM having the disabling level is provided to the P-type pulse width compensation transistor T11, so that the P-type pulse width compensation transistor T11 is turned off; the inverted light-emitting signal EM having the enabling level is provided to the third P-type reset transistor T6 and the fourth P-type reset transistor T7, so that the third P-type reset transistor T6 and the fourth P-type reset transistor T7 are turned on. The other signals are in the disabling level; at this time, the P-type driving transistor T1 is turned off.

In order to describe the current waveform of the pixel circuit 100 in detail, referring to FIG. 1 to FIG. 5, FIG. 3, FIG. 4 and FIG. 5 are waveform diagrams of currents according to some embodiments of the present disclosure.

Figure 3:
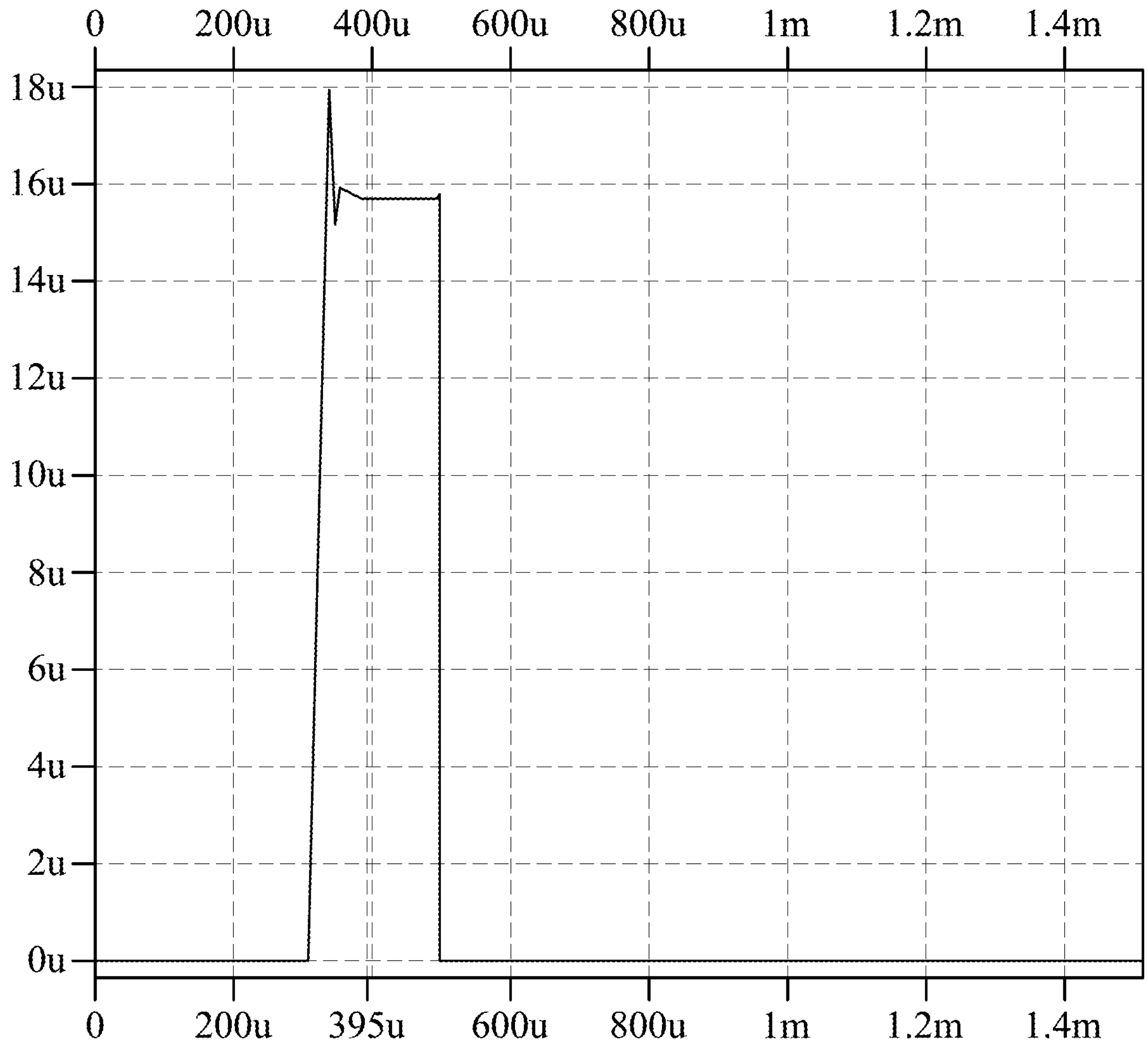
FIG. 3, FIG. 4 and FIG. 5 are waveform diagrams of currents according to some embodiments of the present disclosure.
Figure 4:
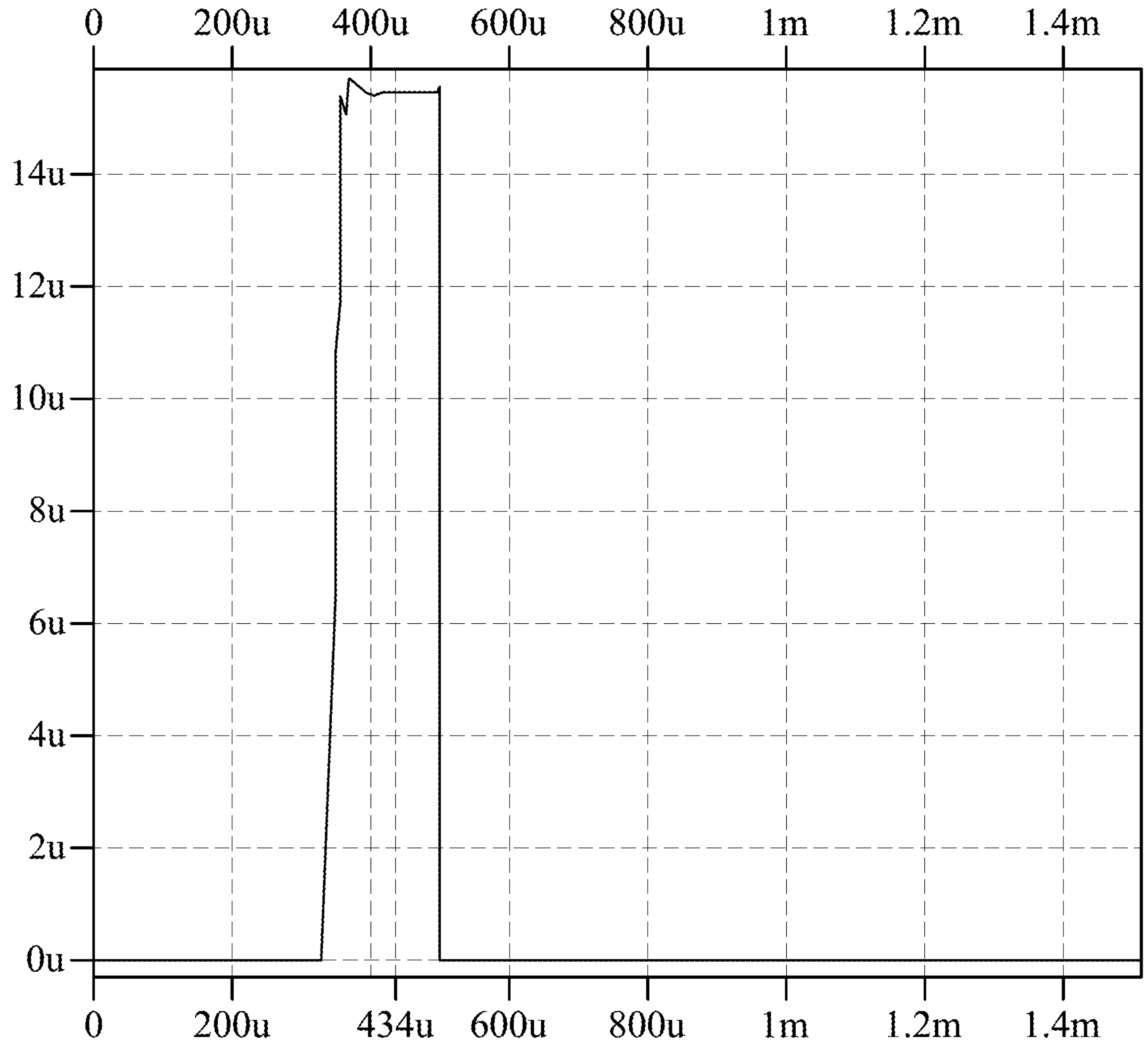
Figure 5:
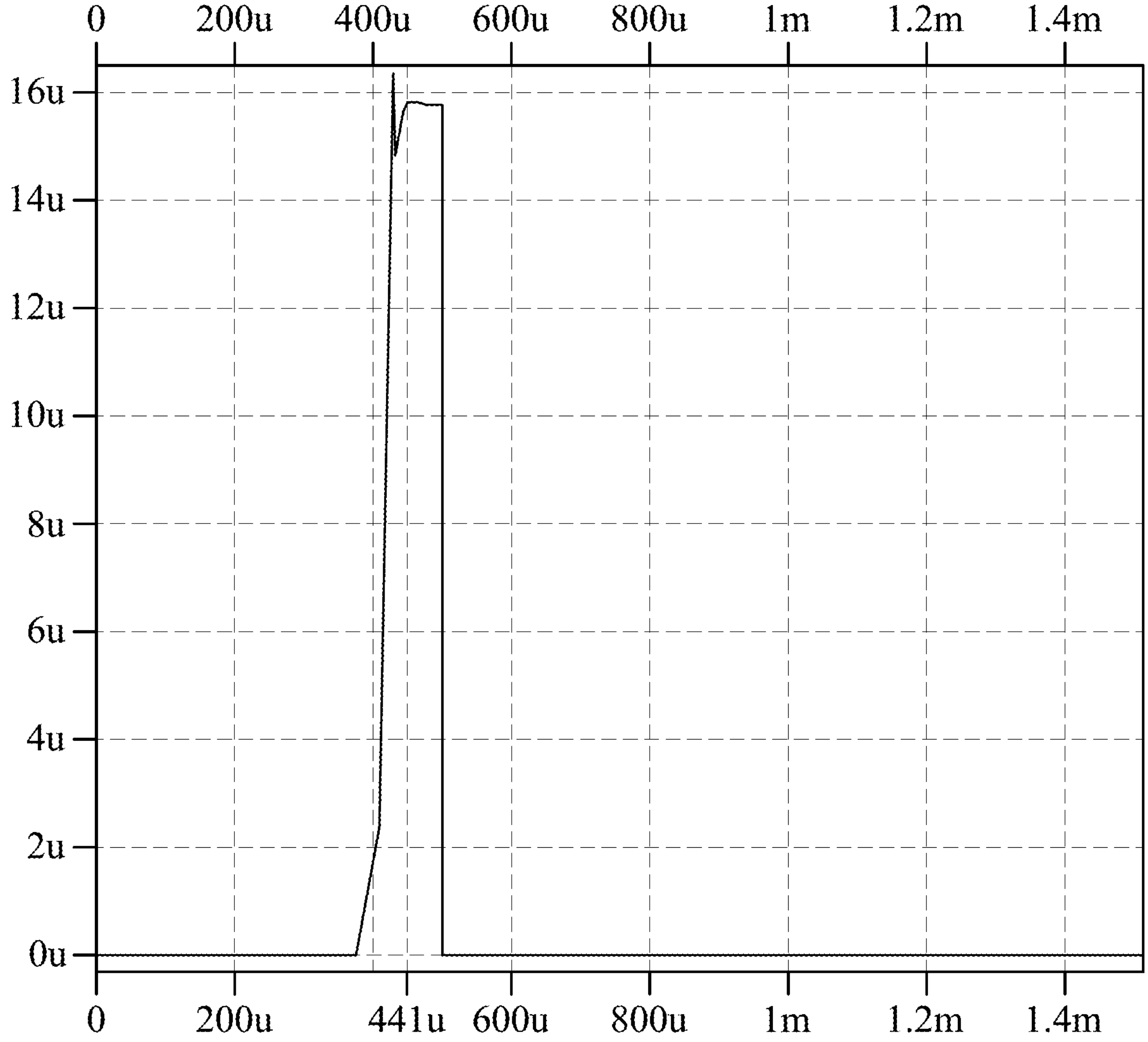

As shown in FIG. 3, FIG. 4 and FIG. 5, in an experimental example, the first operating voltage VDD is DC 8V, the second operating voltage VSS is DC 1V, and the signals S1, S2, EM, and EMB are AC signals with the high voltage 15 V and the low Voltage −3V. The simulation uses different data voltage tests to check whether the width of the current passing through the light-emitting element 111 has successfully changed. The simulation presents the waveform results at room temperature. As shown in FIG. 3, ILED=15.7 uA, and the pulse width is about 176 us. As shown in FIG. 4, ILED=15.7 uA, and the pulse width is about 153 us. As shown in FIG. 5, ILED=15.7 uA, and the pulse width is about 86 us. It can be seen from the simulation results that the pulse width is successfully changed by using different data voltage tests. Therefore, the pixel circuit 100 realizes the function of pulse width compensation.

In view of the above, according to the present disclosure, the pixel circuit 100 of the present disclosure and the operation method thereof using all P-type transistors (e.g., low temperature polysilicon thin film transistors) can save costs and also avoid the problem of insufficient driving capability due to excessive size.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A pixel circuit with pulse width compensation, and the pixel circuit comprising:

a pulse width modulation circuit comprising:

a P-type pulse width compensation transistor; and a first P-type control transistor electrically connected to the P-type pulse width compensation transistor; and a pulse amplitude modulation circuit electrically connected to the pulse width modulation circuit, and the pulse amplitude modulation circuit comprising:

a second P-type control transistor electrically connected to the first P-type control transistor, wherein the second P-type control transistor comprises a first terminal;

a first capacitor electrically connected to the second P-type control transistor;

a second capacitor connected in series with the first capacitor. wherein one terminal of the second capacitor is electrically connected to the first terminal of the second P-type control transistor and the first capacitor, and another terminal of the second capacitor receives a reference voltage;

a P-type driving transistor electrically connected to the first capacitor; and a light-emitting element electrically connected to the P-type driving transistor.

2. The pixel circuit of claim 1, wherein the first P-type control transistor comprises a control terminal, the P-type pulse width compensation transistor comprises a first terminal, a second terminal and a control terminal, the first terminal of the P-type pulse width compensation transistor is electrically connected to the control terminal of the first P-type control transistor, the second terminal of the P-type pulse width compensation transistor receives a scanning voltage, and the control terminal of the P-type pulse width compensation transistor receives a light-emitting signal.

3. The pixel circuit of claim 1, wherein the first P-type control transistor comprises a control terminal, and the pulse width modulation circuit comprises:

a data writing transistor comprising a first terminal, a second terminal and a control terminal, wherein the first terminal of the data writing transistor is electrically connected to the control terminal of the first P-type control transistor, the second terminal of the data writing transistor receives a data voltage, and the control terminal of the data writing transistor receives a control signal.

4. The pixel circuit of claim 1, wherein the first P-type control transistor comprises a first terminal, a second terminal and a control terminal, and the pulse width modulation circuit comprises:

a first P-type reset transistor comprising a first terminal, a second terminal and a control terminal, wherein the first terminal of the first P-type reset transistor is electrically connected to the first terminal of the first P-type control transistor, the second terminal of the first P-type reset transistor is electrically connected to the control terminal of the first P-type control transistor, and the control terminal of the first P-type reset transistor receives a control signal; and a second P-type reset transistor comprising a first terminal, a second terminal and a control terminal, wherein the first terminal of the second P-type reset transistor is electrically connected to the second terminal of the first P-type control transistor, the second terminal of the second P-type reset transistor receives a reference voltage, and the control terminal of the second P-type reset transistor receives the control signal.

5. The pixel circuit of claim 1, wherein the first P-type control transistor comprises a first terminal, the second P-type control transistor comprises a control terminal, and the pulse width modulation circuit comprises:

a P-type reset transistor comprising a first terminal, a second terminal and a control terminal, wherein the first terminal of the P-type reset transistor is electrically connected to the first terminal of the first P-type control transistor and the control terminal of the second P-type control transistor, the second terminal of the P-type reset transistor receives a reference voltage, and the control terminal of the P-type reset transistor receives an inverted light-emitting signal.

6. The pixel circuit of claim 1, wherein the second P-type control transistor comprises the first terminal, a second terminal and a control terminal, the second terminal of the second P-type control transistor receives a driving voltage, and the pulse amplitude modulation circuit comprises:

a P-type reset transistor comprising a first terminal, a second terminal and a control terminal, wherein the first terminal of the P-type reset transistor is electrically connected to the first terminal of the second P-type control transistor, the second terminal of the P-type reset transistor receives a reference voltage, and the control terminal of the P-type reset transistor receives an inverted light-emitting signal.

7. The pixel circuit of claim 1, wherein the P-type driving transistor comprises a first terminal, a second terminal and a control terminal, the light-emitting element comprises an anode and a cathode, the anode of the light-emitting element receives a first operating voltage, the cathode of the light-emitting element is electrically connected to the second terminal of the P-type driving transistor, the first terminal of the P-type driving transistor receives a second operating voltage, the control terminal of the P-type driving transistor is electrically connected to the first capacitor, and the first operating voltage is higher than the second operating voltage.

8. The pixel circuit of claim 7, wherein the pulse amplitude modulation circuit comprises:

a P-type switching transistor comprising a first terminal, a second terminal and a control terminal, wherein the first terminal of the P-type switching transistor is electrically connected to the control terminal of the P-type driving transistor, the second terminal of the P-type switching transistor receives the first operating voltage, and the control terminal of the P-type switching transistor receives a control signal.

9. The pixel circuit of claim 1, wherein the pulse amplitude modulation circuit comprises:

a P-type threshold voltage compensation transistor comprising a first terminal, a second terminal and a control terminal, wherein the second terminal and the control terminal of the P-type threshold voltage compensation transistor receive a reference voltage; and a P-type switching transistor comprising a first terminal, a second terminal and a control terminal, wherein the first terminal of the P-type switching transistor is electrically connected to the first capacitor, the second terminal of the P-type switching transistor is electrically connected to the first terminal of the P-type threshold voltage compensation transistor, and the control terminal of the P-type switching transistor receives a control signal.

10. A pixel circuit with pulse width compensation, and the pixel circuit comprising:

a pulse width modulation circuit comprising:

a P-type pulse width compensation transistor; and a first P-type control transistor electrically connected to the P-type pulse width compensation transistor; and a pulse amplitude modulation circuit electrically connected to the pulse width modulation circuit, and the pulse amplitude modulation circuit comprising:

a P-type driving transistor electrically connected to a light-emitting element; and a second P-type control transistor electrically connected to the first P-type control transistor, and the second P-type control transistor electrically connected to the P-type driving transistor through a capacitor, wherein in an emission period, the P-type pulse width compensation transistor is turned on, so that the first P-type control transistor is turned on to turn on the second P-type control transistor, so as to turn on the P-type driving transistor for driving the light-emitting element to emit light.

11. The pixel circuit of claim 10, wherein the pulse width modulation circuit comprises a first P-type reset transistor, a second P-type reset transistor and a third P-type reset transistor, the pulse amplitude modulation circuit comprises a fourth P-type reset transistor and a P-type switching transistor, the first P-type control transistor comprises a first terminal, a second terminal and a control terminal, the first terminal of the first P-type control transistor is electrically connected to the first and third P-type reset transistors, the second terminal of the first P-type control transistor is electrically connected to the second P-type reset transistor, the control terminal of the first P-type control transistor is electrically connected between the P-type pulse width compensation transistor and the first P-type reset transistor, the fourth P-type reset transistor is electrically connected to the second P-type control transistor, and the P-type switching transistor is electrically connected to the P-type driving transistor and the light-emitting element, wherein in a reset period, the P-type pulse width compensation transistor is turned off by a disabling level of a light-emitting signal, the third and fourth P-type reset transistors are turned on by an enabling level of an inverted light-emitting signal, and the first and second P-type reset transistors and the P-type switching transistor are turned on by the enabling level of a control signal, so that the P-type driving transistor is turned off.

12. The pixel circuit of claim 10, wherein the pulse width modulation circuit comprises a data writing transistor, the pulse amplitude modulation circuit comprises a P-type threshold voltage compensation transistor and a P-type switching transistor, the first P-type control transistor comprises a control terminal, the control terminal of the first P-type control transistor is electrically connected to the P-type pulse width compensation transistor and the data writing transistor, the P-type switching transistor is electrically connected to the P-type driving transistor and the capacitor through a node, the P-type threshold voltage compensation transistor is electrically connected to the P-type switching transistor, and the P-type threshold voltage compensation transistor receives a reference voltage, wherein in a compensation and data input period, the P-type pulse width compensation transistor is turned off by a disabling level of a light-emitting signal, the data writing transistor and the P-type switching transistor are turned on by an enabling level of a control signal, so that the data writing transistor writes a data voltage to the control terminal of the first P-type control transistor, and the P-type threshold voltage compensation transistor discharges the node to the reference voltage plus a threshold voltage of the P-type threshold voltage compensation transistor.

13. The pixel circuit of claim 12, wherein the first P-type control transistor further comprises a first terminal, the second P-type control transistor comprises a first terminal, a second terminal and a control terminal, the P-type driving transistor comprises a control terminal, the control terminal of the first P-type control transistor is electrically connected to the data writing transistor, the first terminal of the first P-type control transistor is electrically connected to the control terminal of the second P-type control transistor, and the first terminal of the second P-type control transistor is electrically connected to the control terminal of the P-type driving transistor through the capacitor, wherein in the emission period, the P-type pulse width compensation transistor is turned on by the enabling level of the light-emitting signal, when the data voltage is greater than a sawtooth voltage received by the P-type pulse width compensation transistor, the first P-type control transistor is turned on to turn on the second P-type control transistor, and the second terminal of the second P-type control transistor receives a driving voltage having the enabling level, so that the P-type driving transistor is turned on to drive the light-emitting element to emit the light.

14. The pixel circuit of claim 10, wherein the pulse width modulation circuit comprises a P-type reset transistor, the pulse amplitude modulation circuit comprises a P-type reset transistor, the P-type reset transistor of the pulse width modulation circuit is electrically connected to the first P-type control transistor, and the P-type reset transistor of the pulse amplitude modulation circuit is electrically connected to the second P-type control transistor, wherein in a turn-off period, the P-type pulse width compensation transistor is turned off by a disabling level of a light-emitting signal, and the P-type reset transistor of the pulse width modulation circuit and the P-type reset transistor of the pulse amplitude modulation circuit are turned on by an enabling level of an inverted light-emitting signal.

15. An operation method of a pixel circuit with pulse width compensation, the pixel circuit comprising a pulse width modulation circuit and a pulse amplitude modulation circuit, the pulse width modulation circuit comprising a P-type pulse width compensation transistor and a first P-type control transistor, the pulse amplitude modulation circuit comprising a P-type driving transistor and a second P-type control transistor, and the operation method comprising:

in an emission period, turning on the P-type pulse width compensation transistor, so that the first P-type control transistor is turned on to turn on the second P-type control transistor, so as to turn on the P-type driving transistor; and driving a light-emitting element to emit light through the P-type driving transistor when the P-type driving transistor is turned on.

16. The operation method of claim 15, wherein the pulse width modulation circuit comprises a first P-type reset transistor, a second P-type reset transistor and a third P-type reset transistor, the pulse amplitude modulation circuit comprises a fourth P-type reset transistor and a P-type switching transistor, and the operation method further comprising:

in a reset period, providing a light-emitting signal having a disabling level for the P-type pulse width compensation transistor, so that the P-type pulse width compensation transistor is turned off;

in the reset period, providing an inverted light-emitting signal having an enabling level for the third and fourth P-type reset transistors, so that the third and fourth P-type reset transistors are turned on; and in the reset period, providing a control signal having the enabling level for the first and second P-type reset transistors and the P-type switching transistor, so that the first and second P-type reset transistors and the P-type switching transistor are turned on, and the P-type driving transistor is turned off.

17. The operation method of claim 15, wherein the pulse width modulation circuit comprises a data writing transistor, the pulse amplitude modulation circuit comprises a P-type threshold voltage compensation transistor and a P-type switching transistor, and the operation method further comprising:

in a compensation and data input period, providing a light-emitting signal having a disabling level for the P-type pulse width compensation transistor, so that the P-type pulse width compensation transistor is turned off;

in the compensation and data input period, providing a control signal having an enabling level for the data writing transistor, so that the data writing transistor is turned on, and the data writing transistor writes a data voltage to a control terminal of the first P-type control transistor; and in the compensation and data input period, providing the control signal having the enabling level for the P-type switching transistor, so that the P-type switching transistor is turned on, and the P-type threshold voltage compensation transistor discharges a node to a reference voltage plus a threshold voltage of the P-type threshold voltage compensation transistor.

18. The operation method of claim 17, further comprising:

in the emission period, providing the light-emitting signal having the enabling level for the P-type pulse width compensation transistor, so that the P-type pulse width compensation transistor is turned on; and in the emission period, when the data voltage is greater than a sawtooth voltage received by the P-type pulse width compensation transistor, turning on the first P-type control transistor to turn on the second P-type control transistor, and providing a driving voltage having the enabling level for the second P-type control transistor, so that the P-type driving transistor is turned on to drive the light-emitting element to emit the light.

19. The operation method of claim 15, wherein the pulse width modulation circuit comprises a P-type reset transistor electrically connected to the first P-type control transistor, the pulse amplitude modulation circuit comprises a P-type reset transistor electrically connected to the second P-type control transistor, and the operation method further comprising:

in a turn-off period, providing a light-emitting signal having a disabling level for the P-type pulse width compensation transistor, so that the P-type pulse width compensation transistor is turned off; and in the turn-off period, providing an inverted light-emitting signal having an enabling level for the P-type reset transistor of the pulse width modulation circuit and the P-type reset transistor of the pulse amplitude modulation circuit, so that the P-type reset transistor of the pulse width modulation circuit and the P-type reset transistor of the pulse amplitude modulation circuit are turned on.

* * * * *